US006376932B1

(12) United States Patent
Yang

(10) Patent No.: US 6,376,932 B1
(45) Date of Patent: Apr. 23, 2002

(54) SOLAR CELL-POWERED BATTERY CHARGING SYSTEM IN WHICH BATTERY OUTPUT IS CONTROLLED IN RESPONSE TO CHARGING CURRENT SUPPLIED BY SOLAR CELL TO BATTERY

(76) Inventor: Tai-Her Yang, No. 59 Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/421,317

(22) Filed: Oct. 18, 1999

(51) Int. Cl.[7] .................................................. H02J 9/00

(52) U.S. Cl. .......................... 307/66; 307/64; 325/101; 323/906; 136/206

(58) Field of Search .................... 307/66, 64; 320/101; 323/906; 136/206

(56) References Cited

U.S. PATENT DOCUMENTS

| | | | | |
|---|---|---|---|---|
| 5,751,133 A | * | 5/1998 | Sato et al. | 320/13 |
| 6,057,665 A | * | 5/2000 | Herniter et al. | 320/101 |

* cited by examiner

*Primary Examiner*—Josic Ballato
*Assistant Examiner*—Robert L. Deberadinis
(74) *Attorney, Agent, or Firm*—Bacon & Thomas

(57) ABSTRACT

The supply of power from a battery to a load is controlled by the charging current output status of a solar cell, such that when the solar cell receives light, the load is cut off; and once the solar cell no longer receives light, the battery is charged to a preset saturation level and the solar cell no longer supplies charging current to the battery, or the charging current falls short of a predetermined level, the battery will revert to an output mode with suspension of the charging function.

7 Claims, 2 Drawing Sheets

SOLAR CELL-POWERED BATTERY CHARGING SYSTEM IN WHICH BATTERY OUTPUT IS CONTROLLED IN RESPONSE TO CHARGING CURRENT SUPPLIED BY SOLAR CELL TO BATTERY

BACKGROUND OF THE INVENTION (a) Field of the Invention

The supply of power from a battery to a load is controlled by the charging current output status of a solar cell, such that when the solar cell receives light, the load is cut off; and once the solar cell no longer receives light, the battery is charged to a preset saturation level and the solar cell no longer supplies charging current to the battery, or the charging current falls short of a predetermined level, the battery will revert to an output mode with suspension of the charging function.

(b) Description of the Prior Art

By and large a traditional solar cell lighting device works so that the battery is charged when the solar cell receives incoming light, and when the solar cell is not receiving light, an ambient brightness detection circuit will intervene to cause the battery to supply power to activate lighting lamps or other loads thus terminating charging once the surroundings turn darker than a predetermined level.

SUMMARY OF THE INVENTION

The primary object of the invention is to provide an advanced design solar cell and interactive loading control system, in which the basis of control lies in the charging current from the solar cell to the battery. Rather than taking the solar cell as a power source for charging purposes, arrangement has been made to avoid overcharging with a view to simplifying the charging control circuits and save costs associated with installation of additional environmental brightness detectors.

DETAILED DESCRIPTION OF THE PREFERRED EMBODIMENTS

Figure 1:
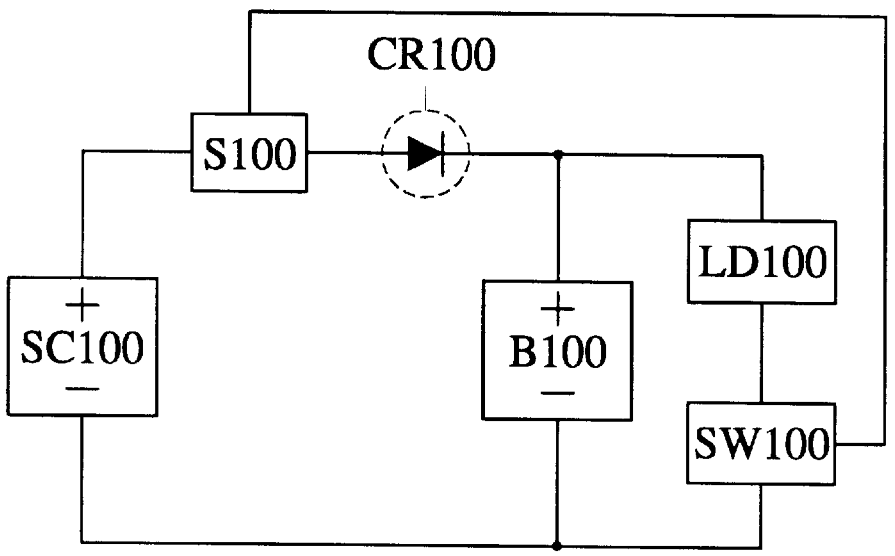
FIG. 1 is a block diagram of a system constructed in accordance with the principles of a preferred embodiment of the invention, comprising a solar cell to battery output charging current detection and load control circuit.

Detection of the working status of the solar cell pursuant to the invention is carried out in a current detection mode. What follows is a detailed description of the principal circuit makeup, improvement features, other functions, and additional objects of the invention with reference to the accompanying drawings, Referring to FIG. 1, which is a block diagram of a preferred system comprising a solar cell to battery output current detection and load control circuit, including the following circuit elements:

Solar Cell SC100, comprising any or a combination of single crystal, multiple crystal or amorphous solar cells capable of converting light energy, and in particular solar energy, into electric power to charge a battery;

Battery B100, comprising a number of cells capable of being recharged and discharged at least twice, or alternatively battery capacitors to receive charging from solar cell SC100, and to discharge current to the Load LD100;

Output Switch SW100, comprising electro-mechanical or solid state electronic circuits to enable output of power from battery B100 to the load or to suspend such output;

Solar Cell Output State Detector S100, comprising electro-mechanical or solid state electronic circuit, which, by the detection of the output voltage or output voltage of the solar cell SC100, controls output switch SW100, and which in turn controls, by way of the battery B100, the working condition of the load LD100; the operation rationale being that once the charging voltage or current occasioned by charging of the battery B100 when solar cell SC100 receives incoming sunlight that exceeds a predetermined level, switch SW100 will be driven by the solar cell output detector S100 so that battery B100 is cut off from the load; while on the contrary when the solar cell SC100 is not receiving any incoming sunlight, or when sunshine turns so low such that the charging voltage or current bearing upon the battery B100 is reduced to a level below a predetermined level or to zero, the circuit S100 will drive the output switch SW100 to conduction, and in turn bring the battery B100 to an ON (feeding) state relative to the load LD100, said solar cell output detection circuit S100 and output switch SW100 being constructed either as an integrated composite device or alternatively as separate devices; in addition, assuming that no change is made to the circuit logic, output switch SW100 may be employed to further control an additionally provided solid-state or electro-mechanical component having a greater switching power so as to manifest itself in a normally open state to the load LD100 when the Solar Cell SC100 is receiving incoming light, but in a normally closed, that is, conductive state to the same load LD100 when SC100 is not receiving any light;

Blocking Diode CR100, in forward serial connection between solar cell SC100 and battery B100 to allow passage of charging currents but check reflux, and which may be installed or not dependent upon circuit requirements;

Load LD100, which may be a load of the type that converts electric power into light, or one meant for conversion from electric power into mechanical energy, thermal energy, chemical energy, or acoustic energy, and which may be autonomously or remotely controlled.

Figure 2:
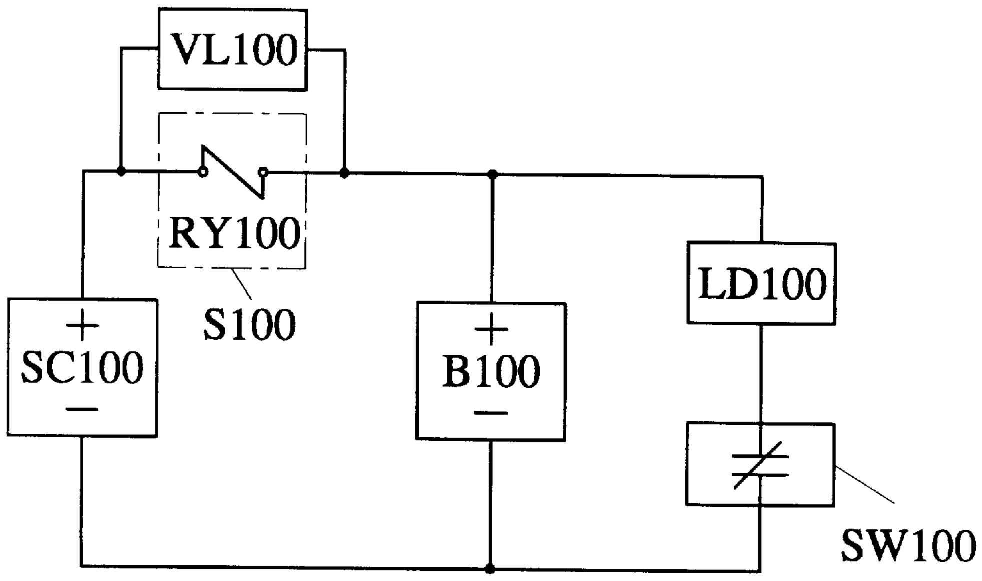
FIG. 2 illustrates a first example of the solar cell to battery output charging current detection and load control circuit of FIG. 1.

FIG. 2, illustrates a specific example of the solar cell to battery output charging current detection and load control circuit of the preferred embodiment of the invention, including the following elements:

Solar Cell SC100: comprising single crystal, multiple crystal or amorphous cells capable of converting light energy, and in particular solar energy, into electric power to charge the battery;

Battery B100, comprising at least one cell or storage capacitor capable of charging and discharging at least twice, and serving to accept charging from solar cell SC100, and to discharge to load LD100;

Solar Cell Output Current Detection Device RY100 and Output Switch SW100 controlled thereby, each of which is a mechanical device, RY100 being a current detection relay to detect the solar cell current output status by which to drive the output switch SW100, and in turn to control the operation status of the battery in relation to the load LD100, the output switch SW100 serving to drive the battery B100 to effect an output to, or to suspend an output from, the load; the operation rationale being such that when the charging current resulting from exposure of solar cell SC100 to incident light is greater than that which causes the current detector RY100 to maintain a holding status, then the current detector RY100 will function and drive the output switch SW100 so that the battery B100 is cut off from the load; but when the solar cell is not receiving incident light, or the light incident upon battery B100 is less than that which suffices to release the current detector RY100, the current detector RY100 will then drive the output switch SW100 to conduction, so that the battery B100 becomes established in an ON state in relation to load LD100, the current detector RY100 and output switch SW100 being integrated together or arranged as separate structures, as preferred;

Output Switch SW100, which is composed of mechanical or solid state electronic circuits that serve to cause battery B100 to supply an output to or withdraw an output from the load, and which, assuming that the circuit control logic remains unchanged, may be adapted to further control a solid state or mechanical switch means having a greater switching capability so as to be in a normally open state in relation to the load LD100 when the solar cell SC100 is receiving incident light, and in a normally closed state when the solar cell SC100 is not receiving incident light;

Current Split Voltage Limiter VL100, which is composed of a zener diode, other diode exhibiting a forward bias, other solid state circuit, or mechanical devices, and which serves to establish an upper limit to the voltage drop formed across both ends of the current detector RY100 when the charging current supplied to the battery B100 from the solar cell SC100 exceeds a predetermined level, while exhibiting a current splitting function at the same time; the current split voltage limiter VL100 being installed independently or integrally with the current detector RY100, and which may also be dispensed with where the need for such a voltage limiter does not exist;

Load LD100, which may be a load of the type that converts electric power into light, or one meant for conversion from electric power into mechanical energy, thermal energy, chemical energy, or acoustic energy, and which may be autonomously or remotely controlled.

Figure 3:
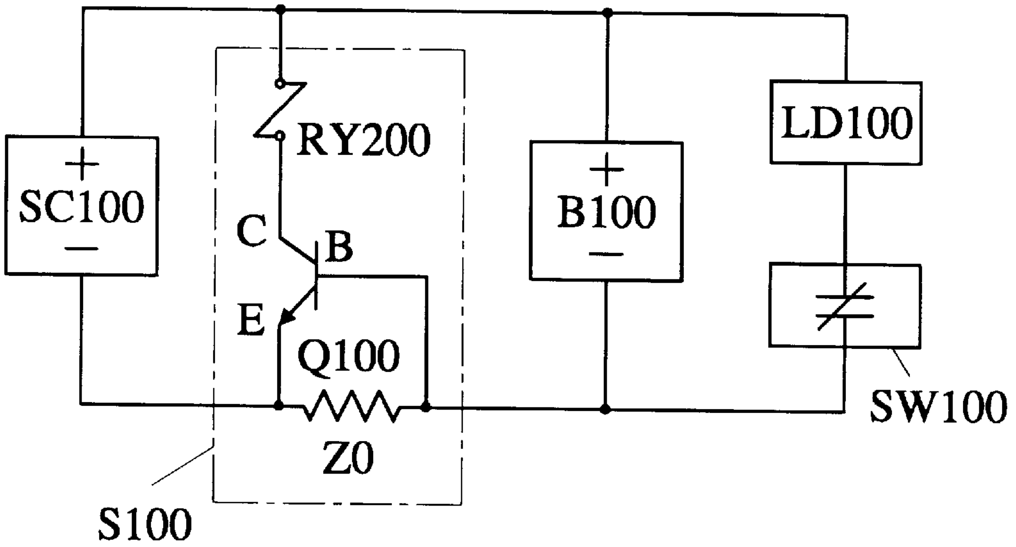
FIG. 3 illustrates a second example of the solar cell to battery output charging current detection and load control circuit of FIG. 1.
Figure 4:
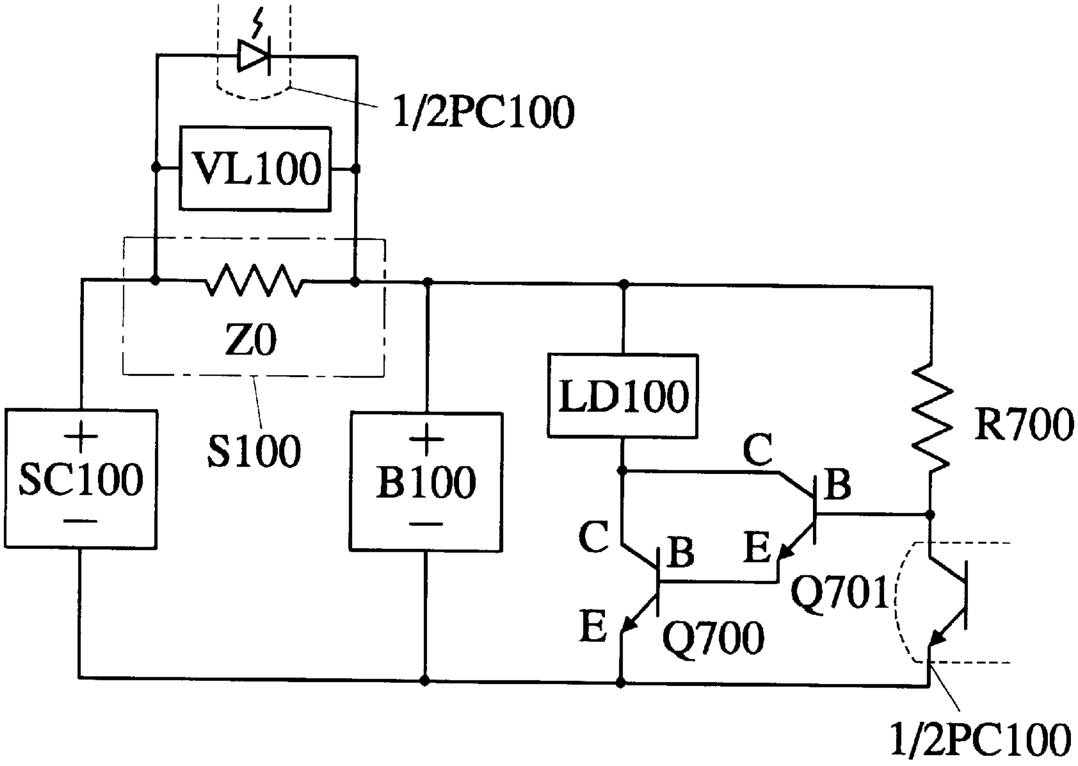
FIG. 4 illustrates a third example of the solar cell to battery output charging current detection and load control circuit of FIG. 1.

FIG. 3 illustrates a second example of the preferred solar cell to battery output charging current detection and load control circuit, including the following elements:

Solar Cell SC100: comprising single crystal, multiple crystal or amorphous cells capable of converting light energy, and in particular solar energy, into electric power to charge the battery;

Battery B100, comprising at least one cell or storage capacitor capable of charging and discharging at least twice, and serving to accept charging from solar cell SC100, and to discharge to load LD100;

Solar Cell Output Current Testing Impedance ZO, which may be composed of resistors or other elements having linear or non-linear characteristic impedances for serial connection between solar cell SC100 and battery B100 on the one hand, and between the base B of switching crystal Q100 and the emitter E of same crystal on the other hand, the collector C and emitter E of the switching crystal Q100 being first connected in series with Relay RY200, and then altogether in parallel across both ends of solar cell SC100; so that when charging current passes due to electric power produced by the exposure of solar cell SC100 to incident light, a corresponding voltage drop VBE will be produced across both ends of the current testing impedance ZO so as to drive the switching crystal Q100 into conduction, and so that Relay RY200 and the output switch SW100 are brought to an open circuit condition; while on the contrary when the light incident upon the solar cell SC100 is reduced or when the solar cell is not being exposed to incident light, the charging current will be reduced in like measure or suspended such that the voltage drop VBE across the current testing impedance ZO is reduced or diminished eventually to zero, thereby cutting off the switching crystal, in turn causing the relay RY200 in series with the switching crystal Q100 to cause the output switch SW100 controlled thereby to close, resulting eventually in an output of electric power coming from the battery B100 to the load LD100, the relay RY200 and output switch SW100 being integrated together or separately structured;

Output Switch SW100, which is composed of mechanical or solid state electronic circuits that serve to cause battery B100 to supply an output to or withdraw an output from the load, and which, assuming that the circuit control logic remains unchanged, may be adapted to further control a solid state or mechanical switch means having a greater switching capability so as to be in a normally open state in relation to the load LD100 when the solar cell SC100 is receiving incident light, and in a normally closed state when the solar cell SC100 is not receiving incident light;

Split Current Voltage Limiter VL100, which may be in the form of a zener diode, a forwardly biased diode, or another solid state electronic circuit or device, and which serves to establish an upper limit to the voltage drop prevailing across both ends of the current testing impedance ZO when the current supplied to the battery B100 from the solar cell SC100 exceeds a predetermined level, thereby accounting for a current splitting effect; such a current splitting voltage limiter VL100 can be installed independently or integrally with the current testing device RY100, or be dispensed with where there does not exist a need for it;

FIG. 4, illustrates a third example of the solar cell to battery output charging current detection and load control circuit, including the following elements:

Solar Cell SC100: comprising single crystal, multiple crystal or amorphous cells capable of converting light energy, and in particular solar energy, into electric power to charge the battery;

Battery B100, comprising at least one cell or storage capacitor capable of charging and discharging at least twice, and serving to accept charging from solar cell SC100, and to discharge to load LD100;

Solar Cell Output Current Testing Impedance ZO composed of a resistor or other elements having linear or non-linear characteristic impedances and connected in series between the solar cell SC100 and the battery B100, with both ends connected in parallel across the input terminals of a photo-emitting diode which is part of the photo-coupler PC100;

Output Switch SW100: in the form of solid state output switching device Q700, Q701, incorporating a single crystal or Darlington switch circuit composed of NPN or PNP switching chips or MOSFETs, with a control resistor R700 being connected in series between the power supply to which the collector C is attached and the control base B so that the solid state switch is normally conductive, wherein between the base B of Q701 and the emitter E of Q700 is connected a photo-coupler PC100 integral with the output terminal of a photo-controlled transistor such that when the solar cell generates electricity upon exposure to incident light, the output current will pass the current testing impedance ZO and develop a voltage drop across both ends of impedance ZO, and once the voltage drop exceeds the working voltage of the photo-emitting diode on the input end of the photo-coupler PC100, the photo-emitting diode will illuminate to render the transistor on the output end conductive, in turn compelling the solid state switch Q700 and Q701 into a cutoff state, whereupon the load LD100 remains non-conductive and in the meantime solar cell SC100 charges with respect to the battery B100; and whereas on the contrary, when the light incident upon the solar cell SC100 is reduced, current passing the current testing impedance ZO will then also be diminished or reduced to zero, at which time the voltage drop developed across both ends of the current testing impedance will likewise downgrade or become eventually reduced to zero, whereupon the photo-emitting diode on the output terminal of the photo-coupler PC100 ceases illumination, with the result that the photo transistor on the same output end of the photo-coupler PC100 gets cut off, the solid state switch Q700 and Q701 are brought in conduction, and the battery B100 is placed in communication with the, the output switch SW100 may be adapted to assume control of a solid state or mechanical switching means of a greater switching capability so as to be in a normally open circuit condition relative to the load when the solar cell SC100 is receiving light, or alternatively in a normally open circuit condition relative to the same load LD100 when the solar cell SC100 is not receiving any light;

Split Current Voltage Limiter VL100, which may be in the form of a zener diode, a forwardly biased diode, or another solid state electronic circuit or device, and which serves to establish an upper limit to the voltage drop prevailing across both ends of the current testing impedance ZO when the current supplied to the battery B100 from the solar cell SC100 exceeds a predetermined level, thereby accounting for a current splitting effect; such a current splitting voltage limiter VL100 can be installed independently or integrally with the current testing device RY100, or be dispensed with where there does not exist a need for it;

Load LD100, which may be of the type arranged to convert electric power into light energy, or to convert electric power into thermal, chemical, mechanical, or acoustic energy, and which may be either autonomously operated or artificially operated by relevant control and switching means.

What is claimed is:

1. A battery-powered system in which a battery is arranged to supply power to a load, said system including a solar cell arranged to charge the battery, comprising:

an output switch connected between said battery and said load;

a solar cell output state detector arranged to detect a charging current supplied by the solar cell to the battery and to control said output switch by opening said output switch when said charging current exceeds a predetermined level, and closing said output switch when said charging current is less than said predetermined level.

2. A system as claimed in claim 1, wherein the solar cell output state detector includes a current detection relay arranged to detect the solar cell current output status and cause said output switch to close whenever said charging current is insufficient to energize said relay.

3. A system as claimed in claim 1, further comprising a voltage limiting circuit element connected between ends of said relay, said voltage limiting circuit element being arranged to shunt charging current past said relay when a voltage drop across said relay exceeds a predetermined amount.

4. A system as claimed in claim 1, wherein the solar cell output state detector includes an impedance connected in series between the solar cell and the battery, said impedance being further connected between a base and an emitter of a transistor, and a collector of said transistor being connected to a relay, said relay being arranged to cause said output switch to close when said charging current is insufficient to turn-on said transistor and thereby energize said relay.

5. A system as claimed in claim 1, wherein the solar cell output state detector includes an impedance connected in series between the solar cell and the battery, and further comprising a photo-coupler including a photo-emitting diode connected in parallel across ends of the impedance, and wherein the output switch is a solid state switch arranged to cut-off a supply of power from said battery to said load when a voltage drop across said impedance is sufficient to activate said photocoupler.

6. A system as claimed in claim 5, wherein said output switch is a Darlington connected switch circuit.

7. A system as claimed in claim 5, further comprising a voltage limiting circuit element connected between ends of said impedance, said voltage limiting circuit element being arranged to shunt charging current past said impedance and said photo-emitting diode when a voltage drop across said impedance exceeds a predetermined amount.

* * * * *